M. B. MOYER.
GATE.
APPLICATION FILED JAN. 9, 1913.
1,094,392.
Patented Apr. 21, 1914.
2 SHEETS—SHEET 2.
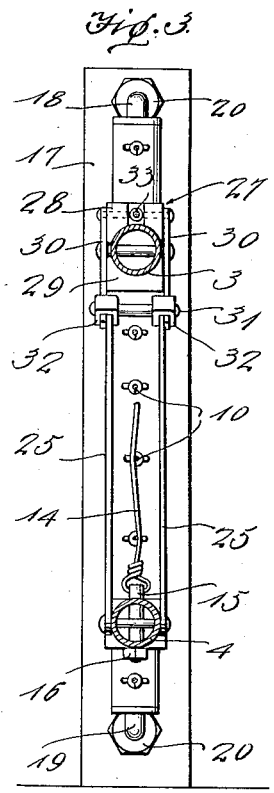
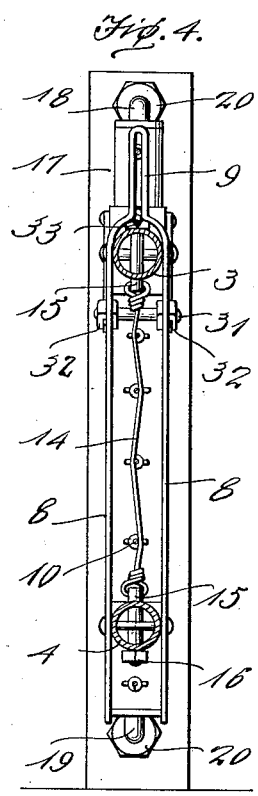
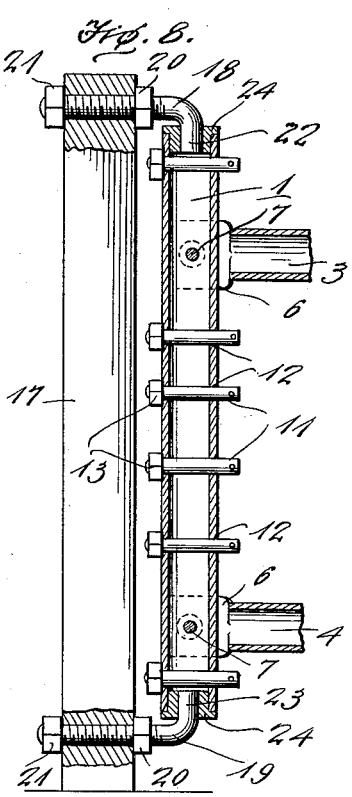
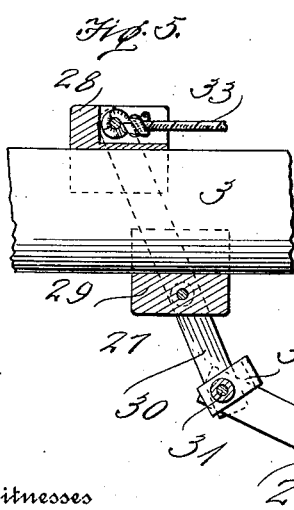
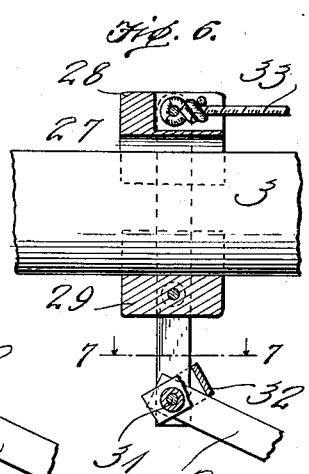
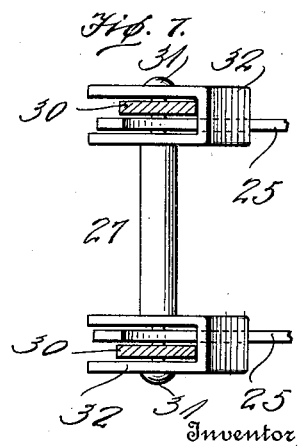
Witnesses
J. R. Pierce
C. E. Hunt
Inventor
Malcomb B. Moyer
By H. B. Willson & Co.
Attorneys

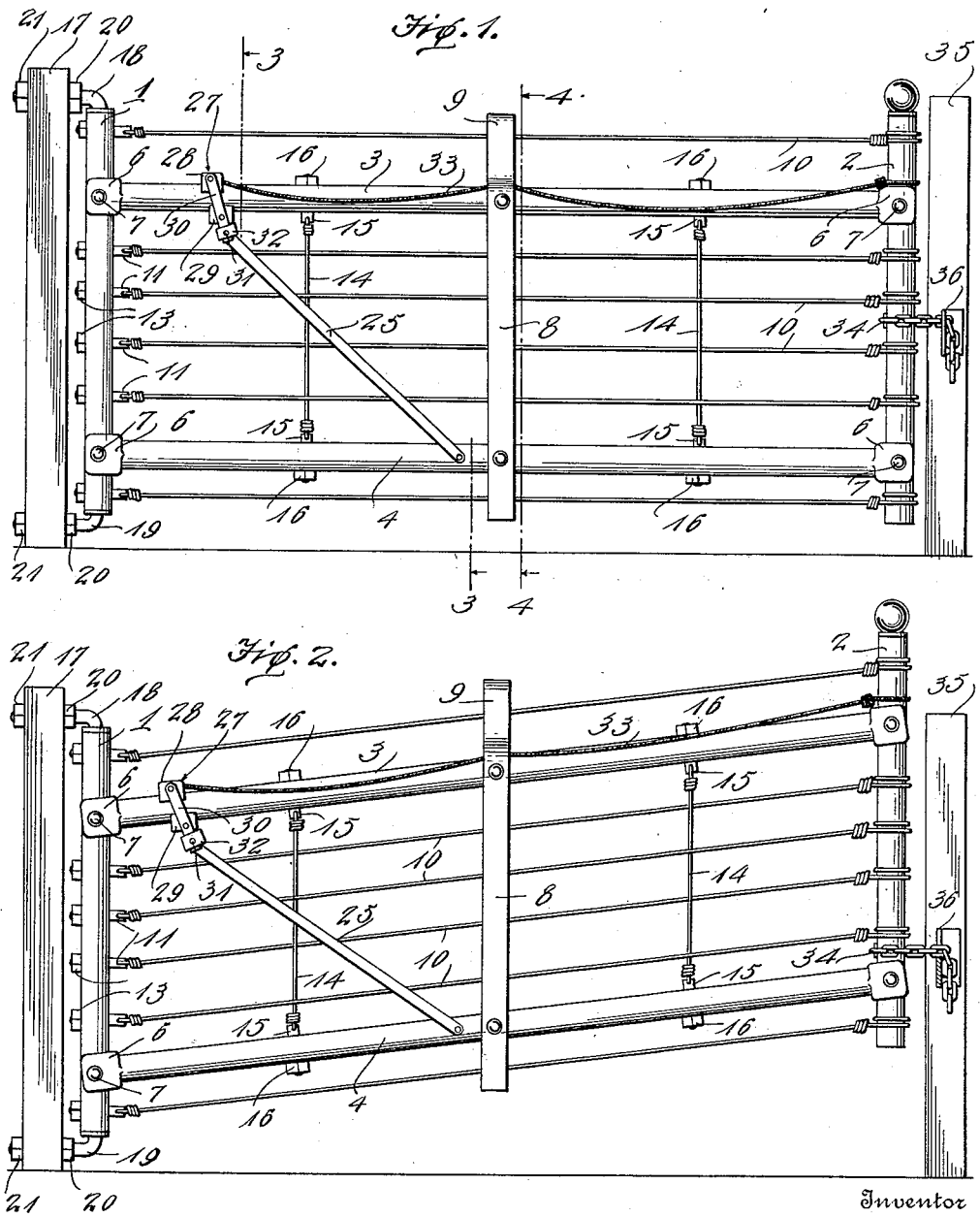

UNITED STATES PATENT OFFICE.

MALCOLM B. MOYER, OF MONTEVIDEO, MINNESOTA.

GATE.

1,094,392.  Specification of Letters Patent.  Patented Apr. 21, 1914.

Application filed January 9, 1913. Serial No. 741,082.

*To all whom it may concern:*

Be it known that I, MALCOLM B. MOYER, a citizen of the United States, residing at Montevideo, in the county of Chippewa and State of Minnesota, have invented certain new and useful Improvements in Gates; and I do declare the following to be a full, clear, and exact description of the invention, such as will enable others skilled in the art to which it appertains to make and use the same.

This invention relates to improvements in gates and particularly to swinging gates.

One object of the invention is to provide a gate of this character adapted to be raised at its free end to permit the same to be swung over obstructions and to permit small stock to pass beneath the gate while in a closed position.

Another object is to provide an improved automatically operating means for holding the gate in a raised position.

With these and other objects in view, the invention consists of certain novel features of construction, and the combination and arrangement of parts as will be more fully described and claimed.

In the accompanying drawings: Figure 1 is a side view of my improved gate showing the same in closed and lowered position; Fig. 2 is a similar view showing the gate closed and the free end thereof elevated to permit the passage of small stock beneath the gate; Fig. 3 is an irregular vertical cross sectional view through the gate taken on the line 3—3 of Fig. 1; Fig. 4 is a vertical cross sectional view taken through the gate on the line 4—4 of Fig. 1; Fig. 5 is an enlarged detail side view of the automatically operating clamping mechanism for holding the free end of the gate in an elevated position and illustrating the parts of the clamp in an operative position; Fig. 6 is a similar view showing the parts of the clamp in an inoperative position; Fig. 7 is a horizontal sectional view of the clamping mechanism taken on the line 7—7 of Fig. 6; Fig. 8 is an enlarged vertical sectional view through the hinged end of the gate and through portions of the hinge post showing the preferred manner of hingedly connecting the gate to the post.

My improved gate comprises a frame consisting of inner and outer end bars 1 and 2 to which are pivotally connected the ends of upper and lower longitudinal bars 3 and 4. The bars 3 and 4 have on their ends parallel apertured ears or attaching plates 6 which are engaged with the end bars 1 and 2 of the gate and are pivotally secured to said end bars by bolts or rivets 7 as shown. The end bars 1 and 2 as well as the upper and lower bars 3 and 4 are preferably of tubular construction as shown but may be constructed in any other suitable manner. The upper and lower bars 3 and 4 of the gate are pivotally connected intermediate their ends by parallel center bars 8 which are preferably formed from a single strip of metal bent intermediately its ends to form a loop 9 which when the bars 8 are engaged with the upper and lower bars of the gate projects a suitable distance above the upper bar 3 as shown. The body of the gate or the filling for the frame thereof may be of any suitable construction or design and is here shown as consisting of a series of parallel longitudinally disposed wire rods 10 one of the ends of which are secured to the outer end bar 2 while the opposite ends are secured to stretching devices in the form of short bolts 11 which are slidably engaged with transverse passages 12 in the inner end bar 1 and have engaged with their outer ends nuts 13 which when screwed up on the bolts draw the latter through the bar 1 thereby stretching the rods 10 and holding the same in a stretched condition. The upper rod 10 of the gate is arranged above the upper cross bar 3 and passes through the upwardly projecting loop 9 on the upper end of the bar 8. The lower rod 10 is disposed below the lower cross bar 4 of the gate frame and passes between the projecting lower ends of the bars 8, as shown. In addition to the longitudinal rods 10 I also preferably provide two or more vertical rods 14 which are woven in and out between the longitudinal rods and which have their ends secured to adjusting bolts 15 slidably mounted in the upper and lower cross bars of the gate frame and which are provided with nuts 16, whereby the bolts may be adjusted for stretching the rods 14. The gate when thus constructed is hingedly supported on a hinge post 17 which may be of any suitable construction and to which the inner end bar 1 of the gate may be hinged in any suitable manner. The bar 1 is preferably hinged to the post 17 by upper and lower angle bolts 18 and 19 which are similar in construction and have their threaded ends inserted through the post 17 near the upper and lower ends thereof. With the threaded ends of the bolts are engaged inner and outer clamping nuts 20 and 21 which when screwed up against the opposite sides of the post 17 securely as well as adjustably fasten the bolts 18 and 19 thereto. The inner ends of the bolts 18 and 19 are bent at right angles to form gate engaging studs 22 and 23, the studs 22 projecting downwardly and the studs 23 projecting upwardly as shown. The studs 22 and 23 are loosely engaged with bushings 24 arranged in the opposite ends of the inner end bar 1 of the gate. By thus hinging the gate, it will be seen, that the same will be firmly supported by the hinge post and may be readily swung in either direction thereon. It will also be noted that by connecting the gate with the hinge post in the manner described, the gate cannot possibly be lifted or disengaged from the hinges.

By pivotally fastening the ends of the upper and lower cross bars 3 and 4 to the end bars 1 and 2 of the gate frame in the manner described, it will be seen, that the outer or free end of the gate may be readily raised and lowered when desired to permit small stock to pass beneath the same while the gate remains in a closed position and to permit the gate to be lifted over obstructions when swung to open or closed positions. In order to support the outer end of the gate in an elevated position when raised in the manner described, I provide a supporting brace 25 comprising a pair of inclined or obliquely disposed bars which are pivotally secured at their lower ends to the opposite sides of the lower cross bar 4 adjacent to the rear or inner side of the central bars 8 and which are connected at their upper ends to the lower ends of a clamping device 27 which is engaged with the upper cross bar 3 of the gate frame as shown. The clamping member 27 comprises upper and lower gripping blocks 28 and 29, said blocks having their inner sides recessed to conform to the shape of the upper and lower sides of the cross bar 3 with which they are adapted to be engaged. The bars 28 and 29 are supported by and pivotally secured to a pair of clamping levers 30 one of which is arranged at each end of the blocks as shown. The blocks are pivotally secured to the levers 30 and are spaced apart between the levers at a suitable distance to clear or disengage the upper bar 3 when the levers are in a vertical position as shown in Fig. 6 of the drawings but which when the levers 30 are disposed at an angle as shown in Fig. 5, said blocks will be brought into engagement with the upper and lower sides of the cross bar 3 and will firmly grip or clamp the latter thereby fastening the upper ends of the brace bars 25 to the upper cross bar 3 thereby holding the free end of the gate in an elevated position as clearly shown in Fig. 2 of the drawings. The upper ends of the brace bars 25 are pivotally connected to the lower ends of the levers 30 by a transversely disposed bolt 31 which extends between the engaging ends of the brace bars and levers and has its ends engaged with alined apertures formed in the ends of the levers and brace bars. The ends of the bolt 31 are also engaged with bail shaped stop members 32 which are applied to the engaging ends of the brace bars and levers on the inner sides or in the angle between said levers and bars and when thus arranged the looped ends of the stop members are adapted to be engaged by the adjacent edges of the levers and brace bars thereby limiting the movement of these parts when the levers have been brought to a vertical position as clearly indicated in Fig. 6 of the drawings. When thus constructed the clamping device 27 will be automatically operated by the brace bars 25 in the following manner: When the free end of the gate is lifted the brace bars 25 will be pushed upwardly and rearwardly thereby swinging the levers 30 to a vertical position against the stop members 32 in the manner described. The levers when thus swung to a vertical position increase the space between the gripping blocks 28 and 29 and thus disengage the latter from the upper and lower sides of the cross bar 3 whereupon a further lifting movement of the free end of the gate will through the connection of the brace bars slide the clamping device rearwardly until the gate has been lifted to a sufficient extent. As soon as the gate has been lifted as far as desired and is released the weight of the free end of the gate will pull downwardly and forwardly on the brace bars 25 thus swinging the levers 30 rearwardly or to the position shown in Figs. 2, 3 and 5 of the drawings thereby bringing the gripping blocks 28 and 29 into clamping engagement with the upper and lower sides of the upper cross bar 3 which will firmly hold the gate in its elevated position. In order to lower the gate after being thus elevated, it is necessary to swing the levers 30 to a vertical position and to thereby disengage the gripping blocks from the upper bar of the gate. This releasing movement of the blocks is effected by means of a cord or other flexible connection 33 which is secured at one end in a recess formed in the upper gripping block 28 and at its opposite end is fastened in any suitable manner to the outer end bar 2 of the gate. The cord 33 is of sufficient length to permit the clamping device to be adjusted to its greatest capacity. When it is desired to release the clamping member for the purpose of lowering the free end of the gate it is first necessary to slightly raise the end of the gate thereby taking the weight of the latter off from the brace bars 25, after which the cord 33 is pulled forwardly thereby swinging the levers 30 to a vertical position and disengaging the gripping blocks from the upper bar 3 which will permit the gate to lower to its normal position.

While I have herein shown and described but one set of brace bars and one clamping device it is obvious that in the case of very large gates the supporting mechanism may be duplicated and applied to the outer portion of the gate in the same manner as the same is shown applied to the inner portion and in which event the clamping devices of both sets of braces would be connected with the same releasing cord and simultaneously operated thereby.

Any suitable means may be employed for fastening the gate in a closed position, the same being here shown as being provided with a chain 34 which is connected at one end to one side of the latch post 35 and is adapted to be passed around the outer end post 2 of the gate and to have its free end engaged with a suitable keeper 36 secured to the opposite side of the latch post as shown. A fastening of this character may be engaged with the outer end post of the gate in any suitable position thereby fastening the gate when the latter is in either a lowered or raised position.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined and claimed.

Having thus particularly described my invention, what I claim is:

1. In a gate of the character described, a frame comprising end bars and cross bars pivotally connected, a pair of brace bars pivotally connected to the lower cross bar, a pair of levers pivotally connected to the upper ends of said brace bars, gripping blocks pivotally connected to said levers and adapted to engage the upper cross bar of the gate frame, stop members mounted on the pivot between said brace bars and levers whereby the movement of these parts in one direction is limited, and means leading from the uppermost block to the free end of the gate for disengaging the gripping blocks, for the purpose set forth.

2. In a gate of the character described, a frame comprising end bars and cross bars pivotally connected, a pair of brace bars pivotally connected to the lower cross bar, a pair of levers pivotally connected to the upper ends of said brace bars, gripping blocks pivotally connected to said levers and adapted to engage the upper cross bar of the gate frame, and stop members mounted on the pivot between said brace bars and levers whereby the movement of these parts is checked when the blocks are in position to disengage said upper cross bar, for the purpose set forth.

3. In a gate of the character described, a frame comprising end bars, upper and lower cross bars pivotally connected at their ends to said end bars, whereby the free end of the gate may be swung upwardly on the hinged end thereof, a gate supporting mechanism comprising a pair of brace bars pivotally connected at their lower ends to the lower cross bar of the gate frame, a clamping device comprising a pair of levers pivotally connected at their lower ends to the upper ends of said brace bars, gripping blocks pivotally connected to said levers and adapted to be engaged with and disengaged from the upper cross bar of the gate frame, whereby the upper ends of said brace bars are adjustably secured to the upper cross bar of the gate frame and the latter thereby supported in an elevated position, stop members pivotally secured to the connected ends of said brace bars and levers, whereby the movement of these parts in one direction is limited, and a flexible releasing element connected with the upper gripping bar of said clamping device, whereby the latter is actuated to disengage the blocks from the upper cross bar of the gate frame thereby releasing the latter and permitting the same to lower.

In testimony whereof I have hereunto set my hand in presence of two subscribing witnesses.

MALCOLM B. MOYER.

Witnesses:
OPHY LOVE,
GERTRUDE LONG.